United States Patent
Stewart et al.

(10) Patent No.: US 11,847,542 B2
(45) Date of Patent: Dec. 19, 2023

(54) APPARATUSES AND METHODS FOR CLASSIFYING TEMPORAL SECTIONS

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/667,665

(22) Filed: Feb. 9, 2022

(65) Prior Publication Data
US 2023/0252342 A1    Aug. 10, 2023

(51) Int. Cl.
*G06N 20/00*     (2019.01)
*G06Q 10/1093*   (2023.01)
*G06Q 10/1053*   (2023.01)

(52) U.S. Cl.
CPC ......... *G06N 20/00* (2019.01); *G06Q 10/1095* (2013.01); *G06Q 10/1053* (2013.01)

(58) Field of Classification Search
CPC ........... G06Q 10/06314; G06Q 10/109; G06Q 10/1091; G06Q 10/1095; G06Q 10/51053; G06Q 10/1093; G06N 20/00
See application file for complete search history.

(56) References Cited

U.S. PATENT DOCUMENTS

| | | | |
|---|---|---|---|
| 7,496,518 B1 * | 2/2009 | Cayton | G06Q 10/10 705/321 |
| 7,937,439 B2 * | 5/2011 | Lurie | G06Q 30/0282 705/347 |
| 8,209,310 B1 * | 6/2012 | Metcalfe | G06Q 30/0207 709/204 |
| 9,280,799 B1 * | 3/2016 | Milian | G06Q 10/1095 |

(Continued)

FOREIGN PATENT DOCUMENTS

| | | | | |
|---|---|---|---|---|
| AU | 2003228510 A2 * | 10/2003 | | G06Q 10/06 |
| CN | 1828659 A * | 9/2006 | | G06Q 10/06 |

(Continued)

OTHER PUBLICATIONS

Wolff et al., Planning for Virtual Interviews: Residency Recruitment During a Pandemic, Oct. 11, 2020.
(Continued)

*Primary Examiner* — Paulinho E Smith
(74) *Attorney, Agent, or Firm* — CALDWELL INTELLECTUAL PROPERTY LAW

(57) ABSTRACT

An apparatus is configured to identify a plurality of temporal ranges, associated with a plurality of first identifiers and a plurality of sets of descriptive data, generate a plurality of temporal sections, wherein generating further includes dividing each temporal range into at least a temporal section of the plurality of temporal sections, receive at least a second identifier, wherein the at least a second identifier is associated with at least a temporal constraint and a set of second (Continued)

identifier data, classify, as a function of the inputs, the at least a first identifier to a particular temporal section of the plurality of temporal sections as a function of the plurality of sets of descriptive data and the at least a set of second identifier data and output the particular temporal section.

18 Claims, 7 Drawing Sheets

(56) References Cited

U.S. PATENT DOCUMENTS

| | | | | |
|---|---|---|---|---|
| 9,471,949 | B1* | 10/2016 | Milian | G06Q 10/0631 |
| 10,096,000 | B2* | 10/2018 | Joao | G06Q 10/105 |
| 10,176,463 | B2* | 1/2019 | Abebe | G06Q 10/1095 |
| 11,049,077 | B1* | 6/2021 | Vukich | G06Q 10/1095 |
| 11,126,677 | B2* | 9/2021 | Levy | G06F 16/4393 |
| 2002/0128894 | A1* | 9/2002 | Farenden | G06Q 10/10 |
| | | | | 705/7.14 |
| 2003/0120531 | A1* | 6/2003 | Parker | G06Q 10/063112 |
| | | | | 705/7.14 |
| 2003/0200168 | A1* | 10/2003 | Cullen, III | G06Q 30/04 |
| | | | | 705/37 |
| 2006/0100919 | A1 | 5/2006 | Levine | |
| 2006/0173775 | A1* | 8/2006 | Cullen, III | G06Q 10/06311 |
| | | | | 705/37 |
| 2006/0190391 | A1* | 8/2006 | Cullen, III | G06Q 10/10 |
| | | | | 705/37 |
| 2006/0195365 | A1* | 8/2006 | Karabetsos | G06Q 30/02 |
| | | | | 705/7.19 |
| 2007/0160963 | A1 | 7/2007 | Diaz et al. | |
| 2011/0088081 | A1* | 4/2011 | Folkesson | G06Q 10/06 |
| | | | | 709/206 |
| 2011/0307400 | A1 | 12/2011 | Chang | |
| 2013/0174093 | A1* | 7/2013 | Peters | G06Q 10/101 |
| | | | | 715/834 |
| 2014/0095400 | A1* | 4/2014 | Jackson | G06Q 10/1053 |
| | | | | 705/321 |
| 2014/0114870 | A1* | 4/2014 | Arabi Katbi | G06Q 10/1053 |
| | | | | 705/321 |
| 2014/0156333 | A1* | 6/2014 | Olivier | G06Q 10/1095 |
| | | | | 705/7.19 |
| 2014/0278683 | A1* | 9/2014 | Kennell | G06Q 10/1095 |
| | | | | 705/7.19 |
| 2015/0242815 | A1* | 8/2015 | Velasco | G06Q 10/1053 |
| | | | | 705/321 |
| 2015/0324747 | A1 | 11/2015 | Corso et al. | |
| 2016/0028848 | A1* | 1/2016 | Gehring | H04L 67/143 |
| | | | | 709/213 |
| 2016/0275458 | A1* | 9/2016 | Meushar | G06Q 10/109 |
| 2017/0316470 | A1* | 11/2017 | Proctor | G06Q 30/0284 |
| 2018/0189743 | A1* | 7/2018 | Balasubramanian | G06N 5/025 |
| 2018/0197147 | A1* | 7/2018 | Cigelnik | G06Q 10/1053 |
| 2018/0240073 | A1* | 8/2018 | Olsher | G06N 5/022 |
| 2018/0285975 | A1* | 10/2018 | Ewanio | G06F 16/337 |
| 2019/0164107 | A1* | 5/2019 | Upadhyay | G06Q 10/06398 |
| 2020/0210965 | A1* | 7/2020 | Garber | G06Q 10/02 |
| 2020/0342412 | A1* | 10/2020 | Jain | G06Q 10/1053 |
| 2021/0224754 | A1* | 7/2021 | Zarakas | G06N 3/08 |
| 2021/0233036 | A1* | 7/2021 | Zarakas | G06F 9/542 |
| 2021/0264372 | A1* | 8/2021 | Asseer | G06Q 10/105 |
| 2021/0406835 | A1 | 12/2021 | Pande | |
| 2022/0027859 | A1* | 1/2022 | Daga | G06Q 10/1095 |

FOREIGN PATENT DOCUMENTS

| | | | |
|---|---|---|---|
| CN | 114245054 A | * | 3/2022 |
| JP | 2004062834 A | * | 2/2004 |

OTHER PUBLICATIONS

Ollington et al., Online social networks: An emergent recruiter tool for attracting and screening, Apr. 30, 2013.

* cited by examiner

APPARATUSES AND METHODS FOR CLASSIFYING TEMPORAL SECTIONS

FIELD OF THE INVENTION

The present invention generally relates to the field of human resources technology. In particular, the present invention is directed to apparatuses and methods for classifying temporal sections.

BACKGROUND

Current ways of creating virtual appointments do not optimize classification algorithms to create appropriate matches.

SUMMARY OF THE DISCLOSURE

In an aspect, an apparatus for using machine learning to classify temporal sections is illustrated. The apparatus includes at least a processor and a memory communicatively connected to the processor, the memory containing instructions configuring the processor to identify a plurality of temporal ranges, associated with a plurality of first identifiers and a plurality of sets of descriptive data, wherein each temporal range of the plurality of temporal ranges is associated a first identifier of the plurality of first identifiers and each first identifier of the plurality of first identifiers is associated with a set of descriptive data of the plurality of sets of descriptive data, generate a plurality of temporal sections, wherein generating further include dividing each temporal range into at least a temporal section of the plurality of temporal sections, receive at least a second identifier, wherein the at least a second identifier is associated with at least a temporal constraint and a set of second identifier data, classify, as a function of the inputs, the at least a first identifier to a particular temporal section of the plurality of temporal sections as a function of the plurality of sets of descriptive data and the at least a set of second identifier data and output the particular temporal section.

In an aspect, a method for using machine learning to classify temporal sections is illustrated. The method includes using a computing device to identify a plurality of temporal ranges, associated with a plurality of first identifiers and a plurality of sets of descriptive data, wherein each temporal range of the plurality of temporal ranges is associated a first identifier of the plurality of first identifiers and each first identifier of the plurality of first identifiers is associated with a set of descriptive data of the plurality of sets of descriptive data, generate a plurality of temporal sections, wherein generating further include dividing each temporal range into at least a temporal section of the plurality of temporal sections, receive at least a second identifier, wherein the at least a second identifier is associated with at least a temporal constraint and a set of second identifier data, classify, as a function of the inputs, the at least a first identifier to a particular temporal section of the plurality of temporal sections as a function of the plurality of sets of descriptive data and the at least a set of second identifier data and output the particular temporal section.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for creating virtual appointments between a recruiter/hiring entity and a job seeker. In an embodiment, temporal sections may include job interviews conducted during an event.

Aspects of the present disclosure can be used by an entity which operates an employment or job matching service which may be utilized by job seekers, employers and/or staffing agencies to create optimal matches for job interviews based on attendees to an event such as a career fair.

Exemplary embodiments illustrating aspects of the present disclosure are described below in the context of several specific examples.

Figure 1:
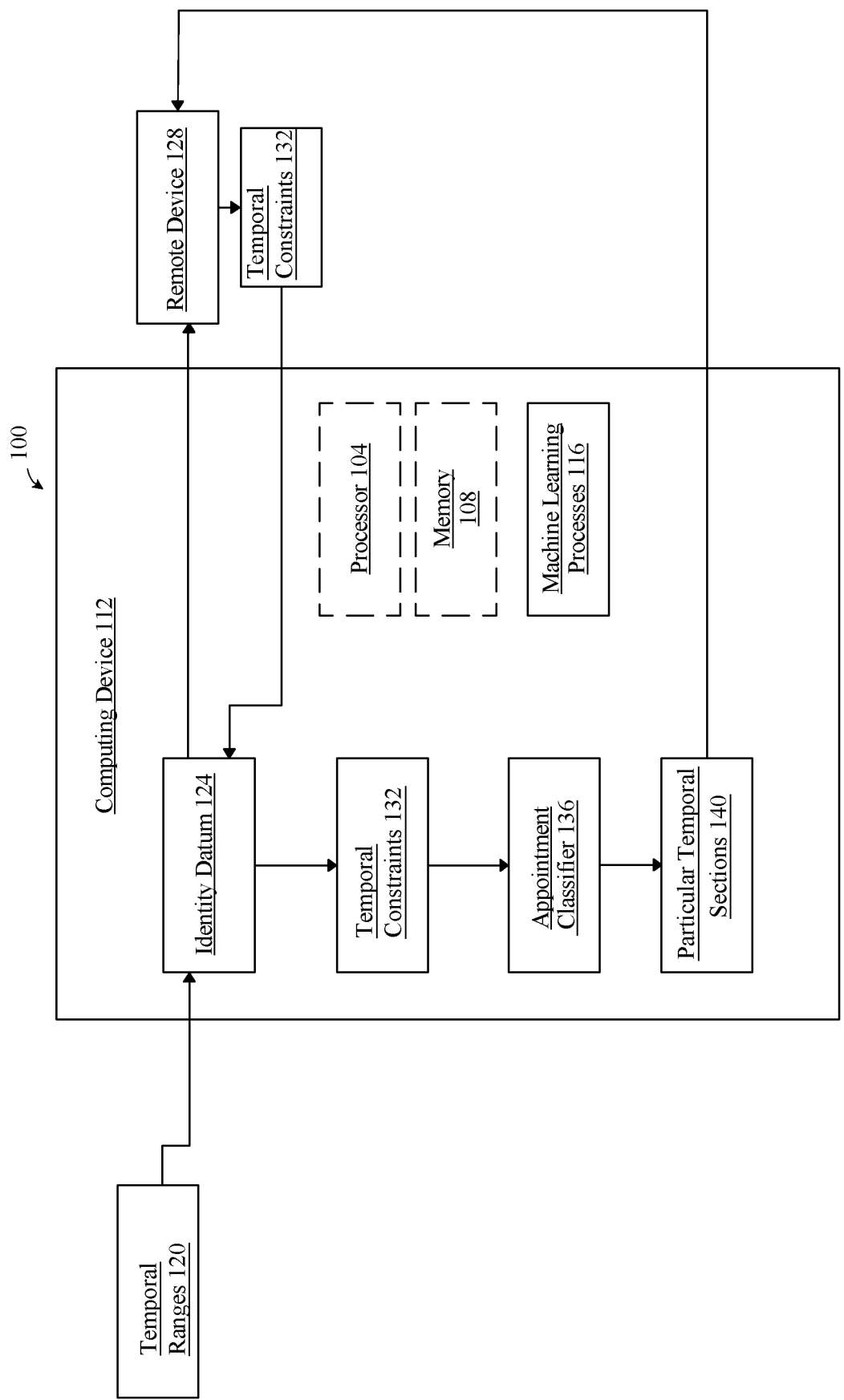
FIG. 1 is a block diagram of an embodiment of an apparatus for classifying virtual temporal sections.

Referring now to FIG. 1, an exemplary embodiment of apparatus 100 for using machine learning to classify temporal sections is illustrated. Apparatus 100 includes processor 104 and memory 108 communicatively connected to processor 104, wherein memory 108 contains instructions configuring processor 104 to carry out the classifying process. In some embodiments, apparatus 100 may include computing device 112. Apparatus 100 may be communicatively connected to computing device 112. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Computing device 112 may include any computing device as described in this disclosure, including without limitation a microcontroller, microprocessor, digital signal processor (DSP) and/or system on a chip (SoC) as described in this disclosure. Computing device 112 may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of apparatus 100 and/or computing device 112.

With continued reference to FIG. 1, processor 104 and/or computing device 112 may be designed and/or configured by memory 108 to perform any method, method step, or sequence of method steps in any embodiment described in this disclosure, in any order and with any degree of repetition. For instance, processor 104 and/or computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Processor 104 and/or computing device 112 may perform determinations, classification, and/or analysis steps, methods, processes, or the like as described in this disclosure using machine learning processes 116. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language.

Still referring to FIG. 1, processor 104 and/or computing device 112 is configured identify a plurality of temporal ranges, associated with a plurality of first identifiers and a plurality of sets of descriptive data. Each temporal range of the plurality of temporal ranges is associated a first identifier of the plurality of first identifiers and each first identifier of the plurality of first identifiers is associated with a set of descriptive data of the plurality of sets of descriptive data. As used in this disclosure, a "first identifier" is an interview host participant at an event, such as a job recruiter or hiring entity. A first identifier may participant in a job fair as part of a panel of job recruiters and the like, seeking to interview potential job candidates. As used in this disclosure, a "temporal range" is the time availability of a first identifier for appointment purposes. In some embodiments, operators of an event may set a predetermined time to identify temporal ranges. For example, first identifiers may be required to submit their availability for interview appointments a week before the career fair or during a specific time while attending the event. First identifiers may submit their availability using a network that processor 104 and/or computing device 112 may be connected to in order to create temporal sections based on temporal ranges 120. In some embodiments, temporal range 120 may include descriptive data associated with a first identifier. Descriptive data, as used in this disclosure, is any first identifier information pertaining to professional areas such as hiring requirements, work description, company history/description, and the like.

Still referring to FIG. 1, Processor 104 and/or computing device 112 is configured to generate a plurality of temporal sections, wherein generating includes dividing each temporal range into at least a temporal section of the plurality of temporal sections. As used in this disclosure, a "temporal section" is indicator on a schedule that pertains to the availability and/or unavailability of event attendees during certain times. In some embodiments, generating the plurality of temporal sections is numerical limited. For example, the number of temporal sections per hour may be limited to a predetermined number to space out the availability of recruiters, allowing more second identifiers the chance to be interviewed. As used in the disclosure, a "second identifier" is an event attendee seeking an interview, such as a job applicant. For example, the system may have a temporal section max of 10 recruiters per hour rather than allowing all recruiters to book for the same hour during the career fair. Processor 104 and/or computing device 112 may create temporal sections using a machine learning algorithm. For example, time temporal ranges 120 of the first identifiers may be an algorithm input and a plurality of temporal sections associated the first identifiers may be the output. Algorithm may use a set of time limitation rules as part of the training data. Training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 1, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs, outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

Supervised machine-learning processes may include classification algorithms, defined as processes whereby a computing device derives, from training data, a model for sorting inputs into categories or bins of data. Classification may be performed using, without limitation, linear classifiers such as without limitation logistic regression and/or naive Bayes classifiers, nearest neighbor classifiers, support vector machines, decision trees, boosted trees, random forest classifiers, and/or neural network-based classifiers.

Still referring to FIG. 1, machine learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 1, machine-learning processes as described in this disclosure may be used to generate machine-learning models. A machine-learning model, as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 1, Processor 104 and/or computing device 112 may be configured to output, as a function of the created temporal sections, first identifier datum 124. As used us in this disclosure, "identify datum" is information pertaining to the set availability of a first identifier based on temporal sections. Processor 104 and/or computing device 112 may be configured to send first identifier datum 124 to second identifiers through remote device 128. As used in this disclosure, a "remote device" is any electronic and/or computing device that the plurality of second identifiers and first identifiers may receive information on. For example, remote device 128 may be a laptop, cellphone, pager, smart watch, and the like. In some embodiments, second identifier may select the output of first identifier datum 124. Second identifier selection may include a first identifier classifier based on descriptive data. A "classifier" is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. In some embodiments, a plurality of first identifier temporal sections may be a classifier input, a plurality of first identifier descriptive data as a part of the training data, and a plurality of categorized first identifiers as the output. For example, a second identifier may select to only see the temporal sections of the plurality of first identifiers based on first identifier background, such as electrical engineering firms. The classification algorithm may output the classified first identifiers matching that background category for processor 104 and/or computing device 112 to display to the second identifier to see the applicable temporal sections.

Still referring to FIG. 1, classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Computing device 112 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\pm P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 112 may then calculate a likelihood table by calculating probabilities of different data entries and classification labels. Computing device 112 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 112 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm: $l = \sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, processor 104 and/or computing device 112 is configured receive at least a second identifier, wherein the second identifier is associated with at least a temporal constraint 132 and a set of user data. A temporal constraint, as used in this disclosure, is a selection of a temporal section of a first user identifier for appointment making purposes. As used in this disclosure, "user data" is any information on a second identifier pertaining to professional areas such as, work, educational and/or personal accomplishments, qualifications, interests, and the like. In some embodiments, user data may be a job resume, cover letter, writing sample, among other things of a second identifier. In some embodiments, processor 104 and/or computing device 112 may acquire a temporal constraint in the form of a bid by a second identifier. As used in this disclosure, a "bid" is a temporal section request procedure followed by a second identifier for appointment matching purposes. Bids may include a second identifier uploading the user data to a network which processor 104 and/or computing device 112 may access to process a second identifier temporal constraint. In some embodiments, bids may include a second identifier requesting to reserve a specific temporal section associated with a first identifier of the plurality of first identifiers. In some embodiments, bids may require different elements of user data from a second identifier for a temporal section associated with a particular first identifier. For example, for a second identifier create a temporal constraint 132 for a specific first identifier out of the plurality of first identifiers, the second identifier may be required to submit in their bid specific documents, such as a cover letter and writing sample. Bidding may occur during a set time at the virtual event based on the number of second identifiers or first identifiers that actually attend the event. In some embodiments, processor 104 and/or computing device 112 may limit the number of temporal constraints 132 received from a particular second identifier. For example, a second identifier may be limited to a set number of bids that may be submitted throughout the event. A second identifier may also be limited to a period in which bids may be placed. For example, bids may only be accepted before a deadline set by an event operator. In some embodiments, the user data from the plurality of second identifiers may be classified against the descriptive data of the plurality of first identifiers, using any classification algorithm as described above. For example, a bid with user data containing nursing experience may be categorized with first identifiers dealing in medical and hospitality work. A user data classifier may take a plurality of second identifier bids as an input, descriptive data of the plurality of first identifiers as training data and output a plurality of matches between second identifiers to first identifiers based on the user data. In some embodiments, user data classifier may use a language processing module to parse elements of user data into a readable machine learning format.

Still referring to FIG. 1, a language processing module may include any hardware and/or software module. The language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model, described further below.

Still referring to FIG. 1, the language processing module may operate to produce a language processing model. Language processing model may include a program automatically generated by computing device and/or language processing module to produce associations between one or more words extracted from at least a document and detect associations, including without limitation mathematical associations, between such words. For example, processor 104 and/or computing device 112 may take a term form an element of user data such as "Patent Attorney" and match to a plurality of first identifiers that contains synonyms such as "USPTO Patent Practitioner Recruiter". Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of a first identifier element, and existence of an inverse element for each vector, and can be multiplied by scalar values under an operation of scalar multiplication compatible with field multiplication, and that has a first identifier element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device may perform this analysis using a selected set of significant documents, such as documents identified by one or more experts as representing good information; experts may identify or enter such documents via graphical second identifier interface, or may communicate first identifiers of significant documents according to any other suitable method of electronic communication, or by providing such first identifier to other persons who may enter such identifications into computing device. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, classification of user data may include ranking the user data classifier output datum in order of compatibility using a fuzzy inference system described further below. Processor 104 and/or computing device 112 is configured to classify a particular second identifier of the plurality of second identifiers to a particular temporal section of the plurality of temporal sections, wherein classifying may include a plurality of event factors. In some embodiments, event factors may include bidding priority (e.g., first to bid first to reserve), bidding temporal constraint quality (e.g., if a second identifier submitted the proper user data), bidding limitations (number of bids a second identifier can place may correlate to the number of a appointments that may be generated for the second identifier), temporal section amendments or abandonment by first identifiers, and the like. Processor 104 and/or computing device 112 may use any machine learning process described throughout this disclosure, such as a classifier algorithm, to generate appointments between a second identifier and a first identifier. Appointment classifier 136 may take bids of the plurality of second identifiers as inputs and output a plurality of appointments between a second identifier and a first identifier. The training data may include the plurality of event factors, output datum of user data classifier, and first identifier datum 124 to match each second identifier of the plurality of second identifiers to at least one first identifier for appointment purposes.

Still referring to FIG. 1, processor 104 and/or computing device 112 is configured to output particular temporal sections 140 between a plurality of first identifiers and a plurality of second identifiers. As used in this disclosure, a "particular temporal section" is a schedule showing the generated appointments between second identifiers and first identifiers at an event. In some embodiments, particular temporal sections 140 may be outputted via electronic notification to second identifiers and first identifiers. The notification (or alert) may involve an email, text message, automated voice call, and the like, among others sent to remote device 128. Particular temporal sections 140 may be outputted freely during the event or systematically. For example, if there is a set time for all second identifiers at the event to submit their Bids then the appointments may be generated after that set time period has closed for all second identifiers at once. Alternatively, if there is no set time period for second identifiers to bid then appointments may be created between the second identifier and recruiter as they are selected throughout the event.

Figure 2:
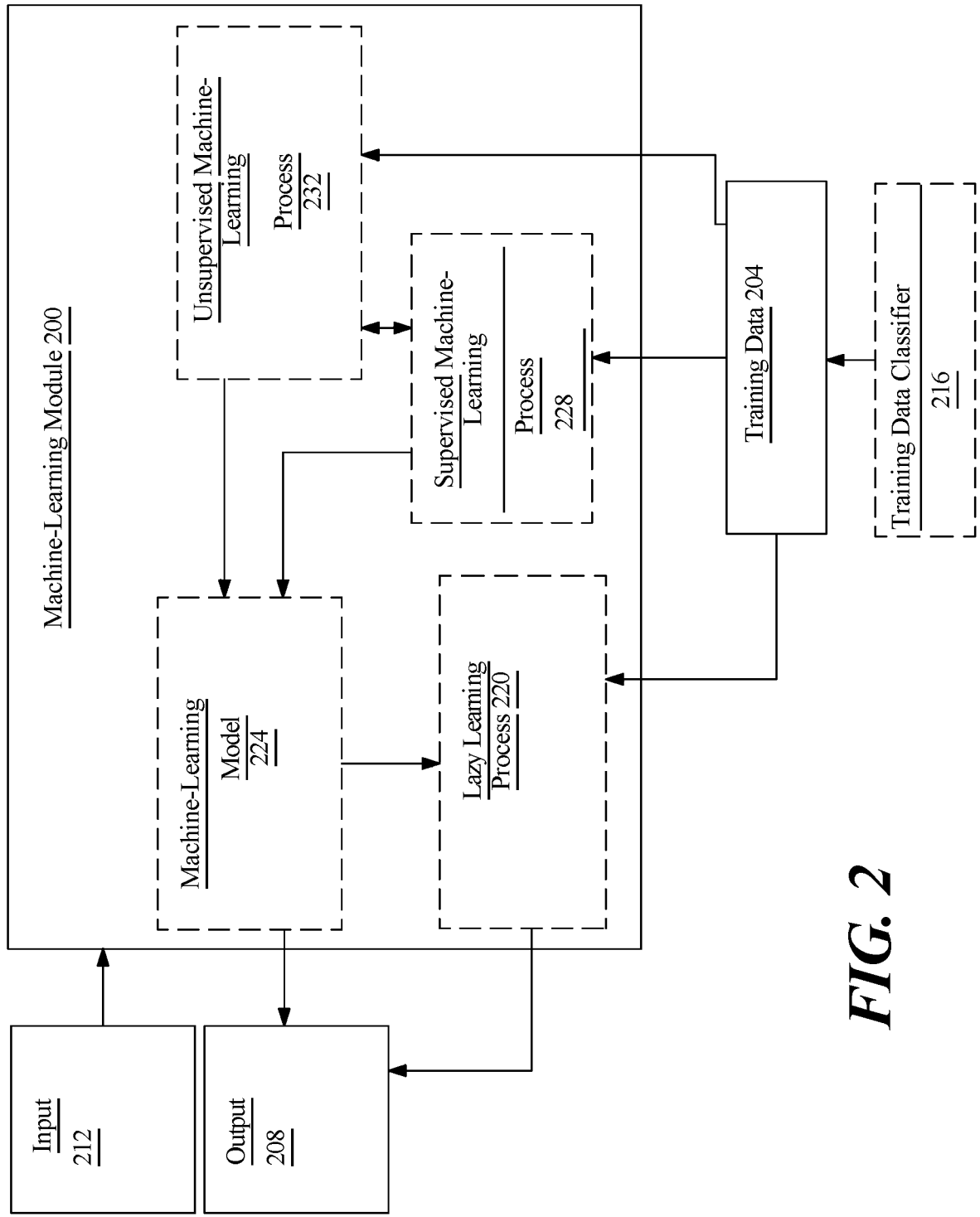
FIG. 2 is a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212. "Training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may inputs and outputs, as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
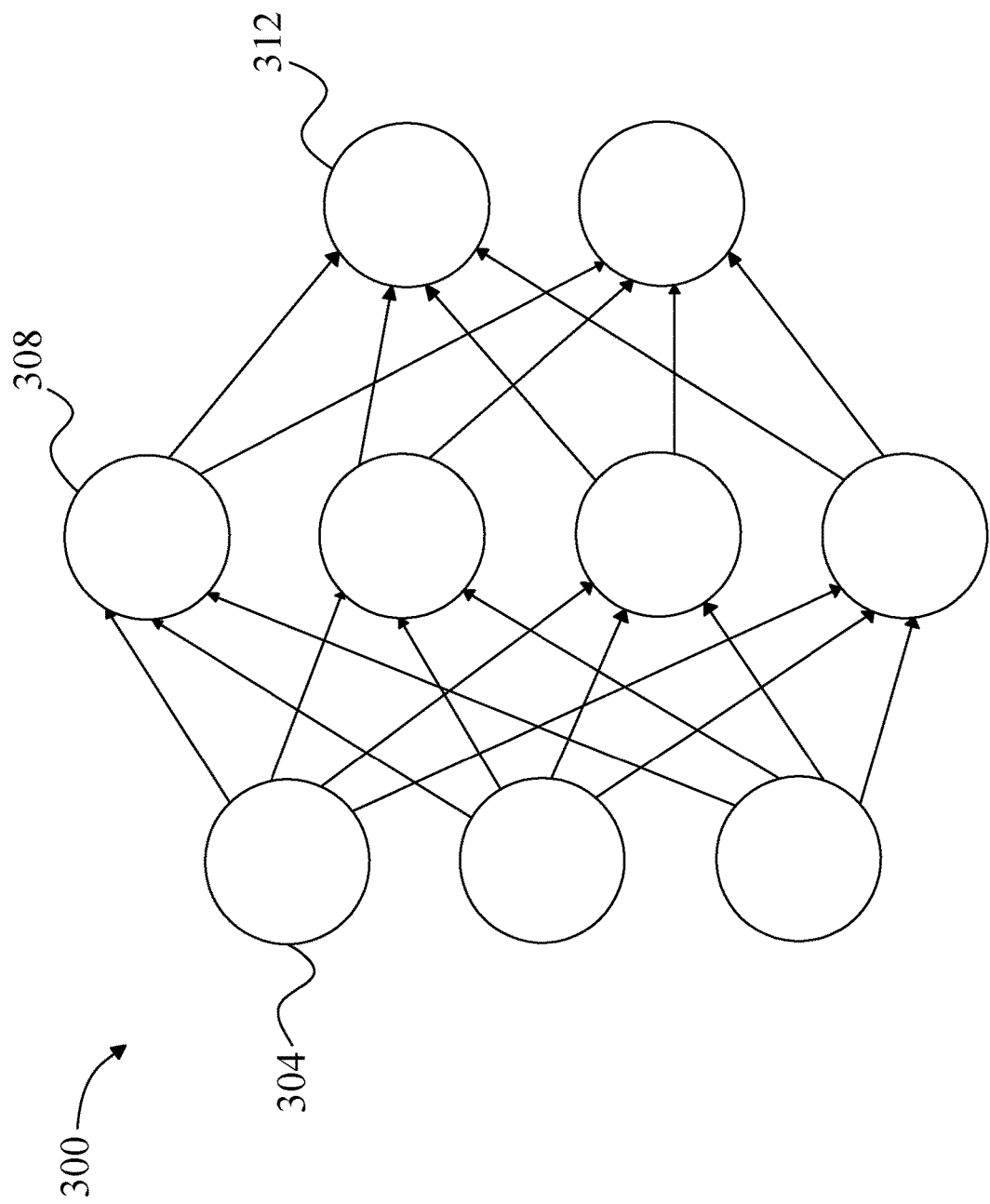
FIG. 3 illustrates an exemplary nodal network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 4:
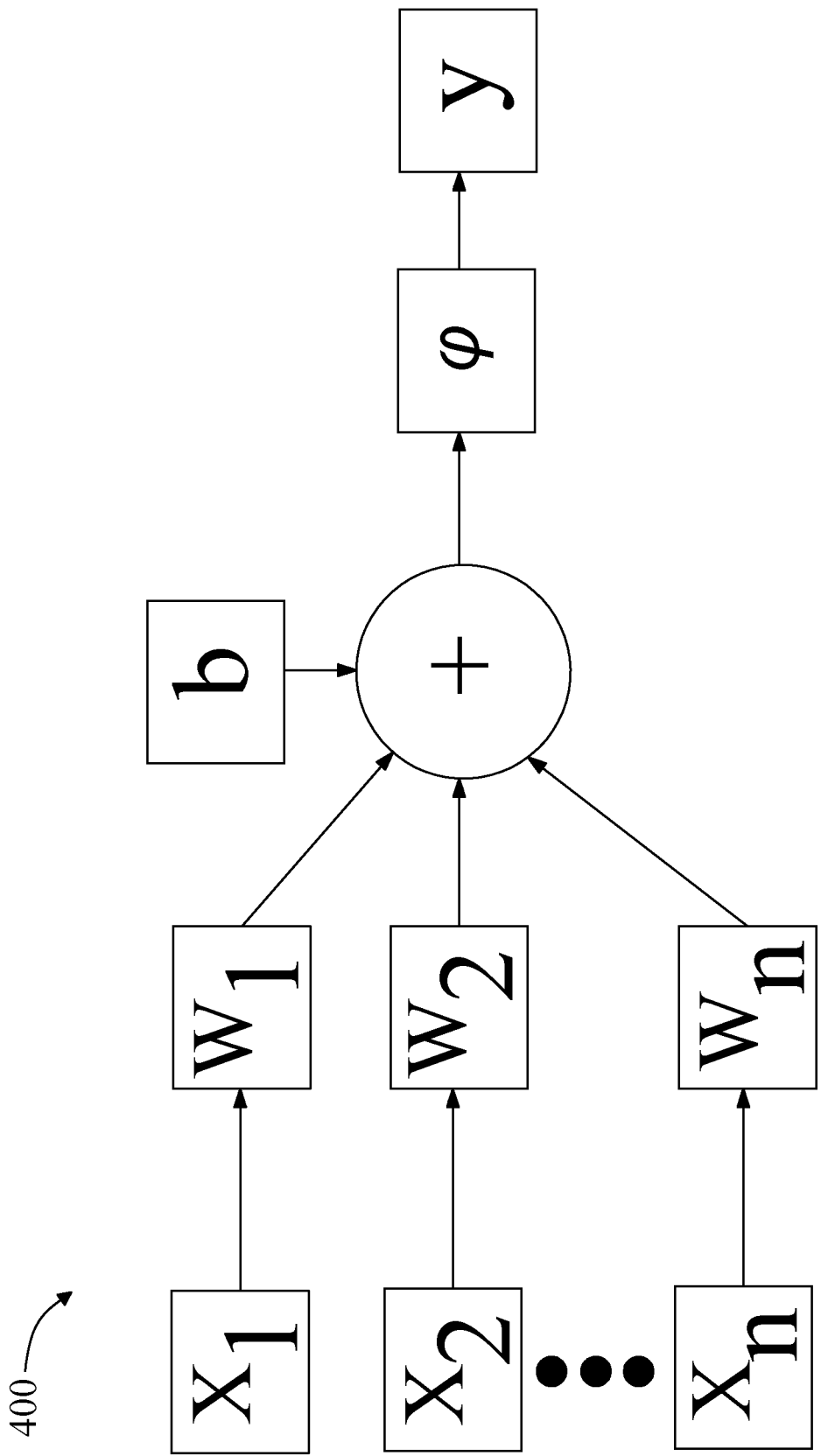
FIG. 4 is a block diagram of an exemplary node.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
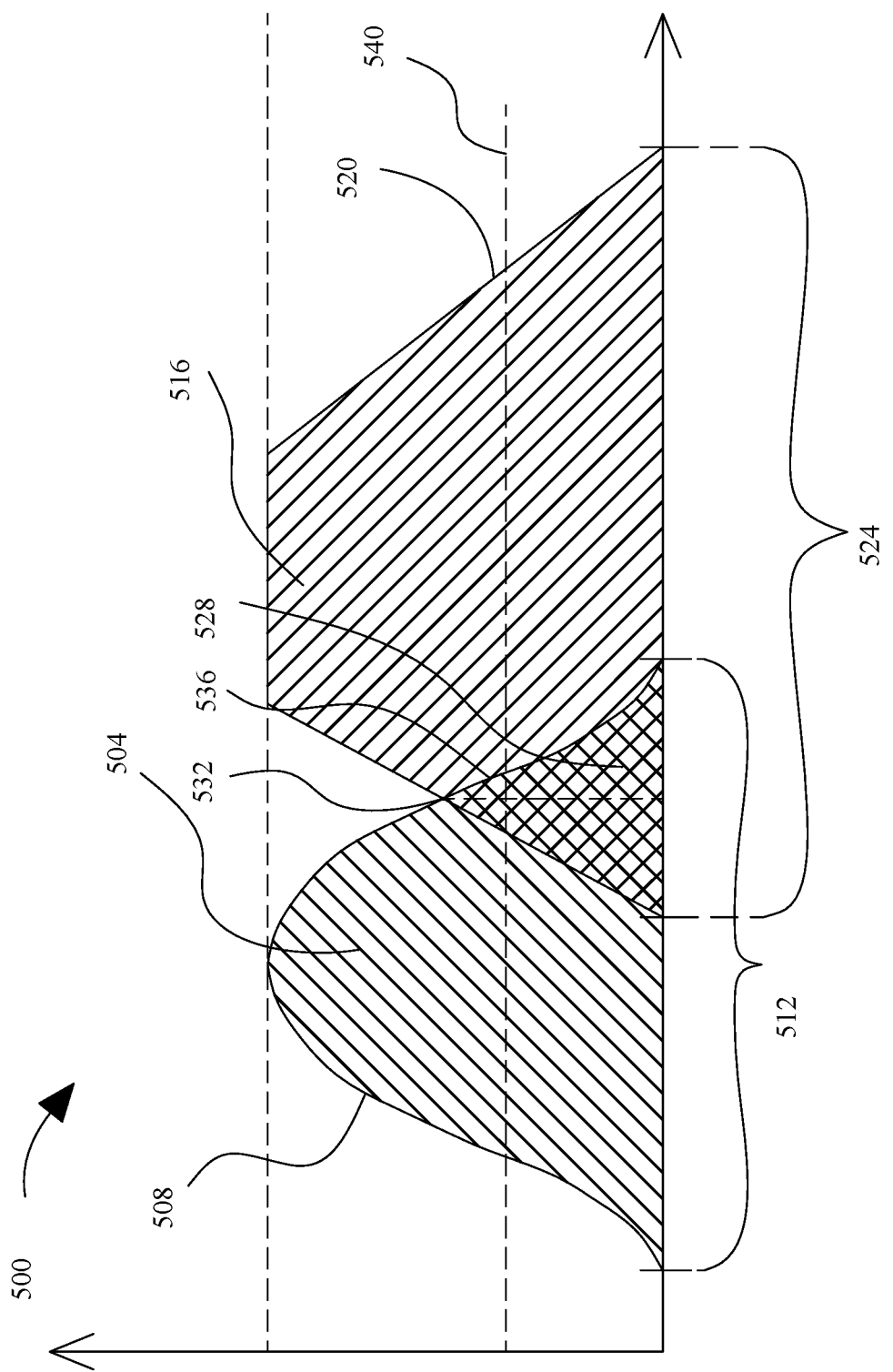
FIG. 5 is a graph illustrating an exemplary relationship between fuzzy sets.

Referring now to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine learning processes (e.g., user data classifier output data). A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and a predetermined class, such as without limitation sub-quantifiers of a posting category, for combination to occur as described above. Alternatively or additionally, each threshold may be tuned by a machine-learning and/or statistical process.

Still referring to FIG. 5, in an embodiment, outputs from an user data classifier may be compared to multiple class fuzzy sets representing elements of and/or pertaining to a compatibility criterion. For instance, one categorized bin containing an user data match between a particular second identifier and first identifier may be represented by an individual fuzzy set that is compared to each of the multiple class fuzzy sets; and a degree of overlap exceeding a threshold between the individual fuzzy set and any of the multiple class fuzzy sets may cause processor 104 and/or computing device 112 to rank the output datum of the user data classifier. For instance, in one embodiment there may be two class fuzzy sets, representing a first output of user data classifier and a second output of user data classifier. First output of user data classifier may have a first fuzzy set; second output of user data classifier may have a second fuzzy set; and inputs from a compatibility criterion may have an individual fuzzy set. Processor 104 and/or computing device 112, for example, may compare an individual fuzzy set with each of first fuzzy set and second fuzzy set, as described above, and rank user data classifier output datum based on the first and second fuzzy sets. Machine-learning methods as described throughout may, in a non-limiting example, generate coefficients used in fuzzy set equations as described above, such as without limitation x, c, and σ of a Gaussian set as described above, as outputs of machine-learning methods. Likewise, subject-specific data may be used indirectly to determine a fuzzy set, as the fuzzy set may be derived from outputs of one or more machine-learning models that take the subject-specific data directly or indirectly as inputs. Although an exemplary application for fuzzy set matching is described above, fuzzy set matching may be used for any classifications or associations described within this disclosure.

Figure 6:
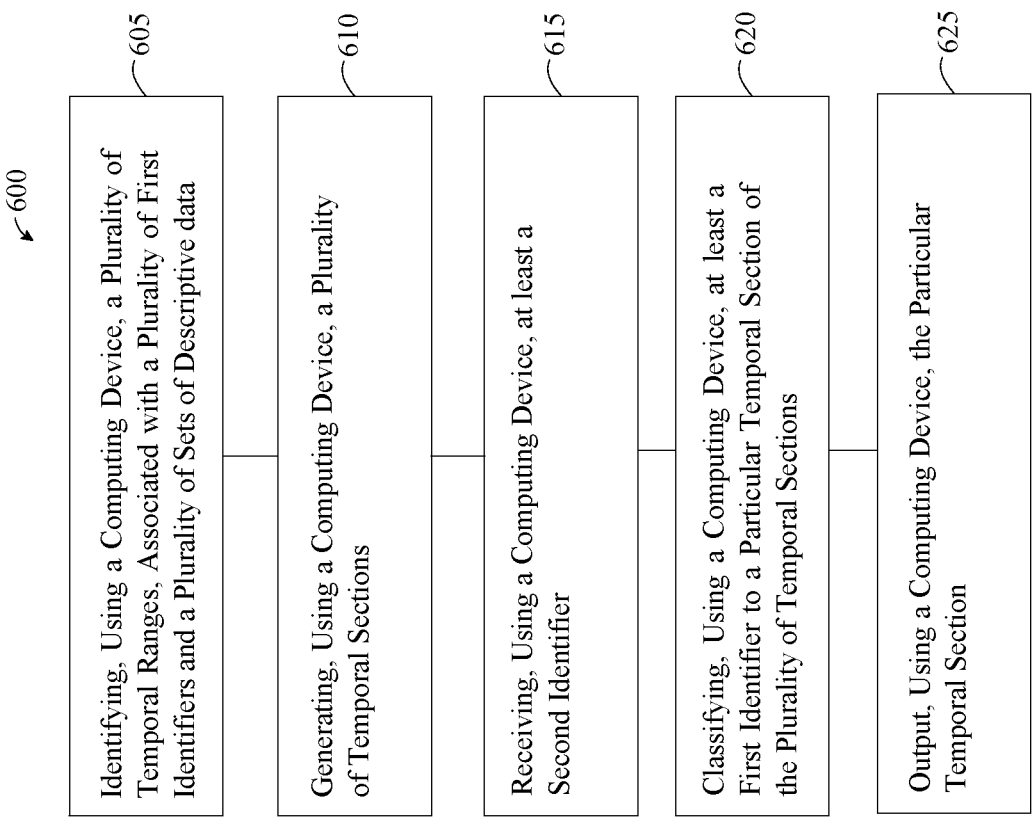
FIG. 6 is a flow diagram of an exemplary method for classifying virtual temporal sections.

Referring now to FIG. 6, a flow diagram of exemplary method 600 for using machine learning to classify temporal sections. At step 605, method include using a computing device to identify, as described an defined in FIG. 1, a plurality of temporal ranges, associated with a plurality of first identifiers and a plurality of sets of descriptive data, wherein each temporal range of the plurality of temporal ranges is associated a first identifier of the plurality of first identifiers, and each first identifier of the plurality of first identifiers is associated with a set of descriptive data of the plurality of sets of descriptive data. The computing device may be any computing device described through this disclosure, for example and with reference to FIG. 1. In some embodiments, operators of a virtual event may set a predetermined time for identifying temporal ranges. For example, first identifiers may be required to submit their availability for interview appointments a week before the career fair or during a specific time while attending the event. First identifiers may submit their availability using a network that the computing device may be connected to in order to create temporal sections based on temporal ranges. In some embodiments, a temporal range may include descriptive data, as defined in FIG. 1, as the technical background of a first identifier. For example, the company history, work focus, hiring criterion and the like. At step 610, method including using the computing device to generate a plurality of temporal sections, wherein generating further includes dividing each temporal range into at least a temporal section of the plurality of temporal sections, as described in FIG. 1. In some embodiments, creating the plurality of temporal sections is numerical limited. For example, the number of temporal sections per hour may be limited to a predetermined number to space out the availability of recruiters, allowing more second identifiers the chance to be interviewed. The computing device may create temporal sections using a machine learning algorithm as disclosed in FIGS. 1 and 2. For example, temporal ranges of the first identifiers may be an algorithm input and a plural temporal section associated the first identifiers may be the output. The algorithm may use a set of time limitation rules as part of the training data.

Still referring to FIG. 6, method may include using a computing device to output, as a function of the created temporal sections, first identifier datum as defined in FIG. 1. The computing device may be configured to send first identifier datum to second identifiers through a remote device. In some embodiments, a second identifier, as defined in FIG. 1, may select the output of first identifier datum 124. Second identifier selection may include a first identifier classifier based on descriptive data, as defined, and disclosed in FIG. 1. In some embodiments, descriptive data may be the hiring requirements, work description, company history/description, and the like of a first identifier. In some embodiments, a plurality of first identifier temporal sections may be a classifier input, a plurality of first identifier descriptive data as a part of the training data, and a plurality of categorized first identifiers as the output. For example, a second identifier may select to only see the temporal sections of the plurality of first identifiers based on first identifier background, such as electrical engineering firms. A classification algorithm may output the classified first identifiers matching that background category for the computing device to display to the second identifier to see the applicable temporal sections.

Still referring to FIG. 6, at step 615, method includes using a computing device to receive at least a second identifier, wherein the second identifier is associated with at least a temporal constraint and a set of second identifier data, for example and with reference to FIG. 1. In some embodiments, the computing device may acquire a temporal constraint in the form of a bid by a second identifier. Bids, as defined in FIG. 1, may include a second identifier uploading user data, as defined in FIG. 1, to a network which the computing device may access to process a second identifier temporal constraint. In some embodiments, bids may include a second identifier requesting to reserve a specific temporal section associated with a first identifier of the plurality of first identifiers. In some embodiments, bids may require different elements of user data from a second identifier for a temporal section associated with a particular first identifier. For example, for a second identifier to create a temporal constraint for a specific first identifier out of the plurality of first identifiers, the second identifier may be required to submit in their bid specific documents, such as a cover letter and writing sample. Bidding may occur during a set time period at the event based on the number of second identifiers or first identifiers that actually attend the event. In some embodiments, the computing device may limit the number of temporal constraints received from a particular second identifier. For example, a second identifier may be limited to a set number of bids that may be submitted throughout the event. A second identifier may also be limited to a period in which bids may be placed. For example, Bids may only be accepted before a deadline set by an event operator. In some embodiments, the user data from the plurality of second identifiers may be classified against the descriptive data of the plurality of first identifiers, using any classification algorithm as described in FIGS. 1 and 2. For example, a bid with user data containing nursing experience may be categorized with first identifiers dealing in medical and hospitality work. A user data classifier may take a plurality of second identifier bids as an inputs, descriptive data of the plurality of first identifiers as training data, and output a plurality of matches between second identifiers to first identifiers based on the user data. In some embodiments, user data classier may use a language processing module to parse elements of user data into a readable machine learning format, for example and with reference to FIG. 1. Classification of user data may include ranking the user data classifier output datum in order of compatibility using a fuzzy inference system as describe in FIG. 5.

Still referring to FIG. 6, at step 620, method includes using a computing device to classify, as a function of the inputs, a first identifier to a particular temporal section of the plurality of temporal sections as a function of the plurality of sets of descriptive data and at least a set of second identifier data. In some embodiments, classification may be based on event factors that include bidding priority (e.g., first to bid first to reserve), bidding temporal constraint quality (e.g., if a second identifier submitted the proper action data), bidding limitations (number of bids a second identifier can place may correlate to the number of a appointments that may be generated for the second identifier), temporal section amendments or abandonment by first identifiers, and the like. The computing device may use any machine learning process described throughout this disclosure, such as a classifier algorithm, to generate appointments between a second identifier and a first identifier. An appointment classifier may take the bids of the plurality of second identifiers as inputs and output a plurality of appointments between a second identifier and a first identifier. The training data may include the plurality of event factors, output datum of user data classifier, and first identifier datum to match each second identifier of the plurality of second identifiers to at least one first identifier for appointment purposes.

Still referring to FIG. 5, at step 625, method includes using a computing device to output particular temporal sections between a plurality of first identifiers and a plurality of second identifiers, as defined and disclosed in FIG. 1. In some embodiments, the particular temporal sections may be outputted via electronic notification to second identifiers and first identifiers. The notification (or alert) may involve an email, text message, automated voice call, and the like, among others sent to a remote device. As used in this disclosure, a "remote device" is any electronic and/or computing device that the plurality of second identifiers and first identifiers may receive information on. For example, remote device 128 may be a laptop, cellphone, pager, smart watch, and the like. Temporal sections may be outputted freely during the event or systematically. For example, if there is a set time for all second identifiers at the event to submit their bids then the appointments may be generated after that set time period has closed for all second identifiers at once. Alternatively, if there is no set time for second identifiers to bid then appointments may be created between the second identifier and recruiter as they are selected throughout the event.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
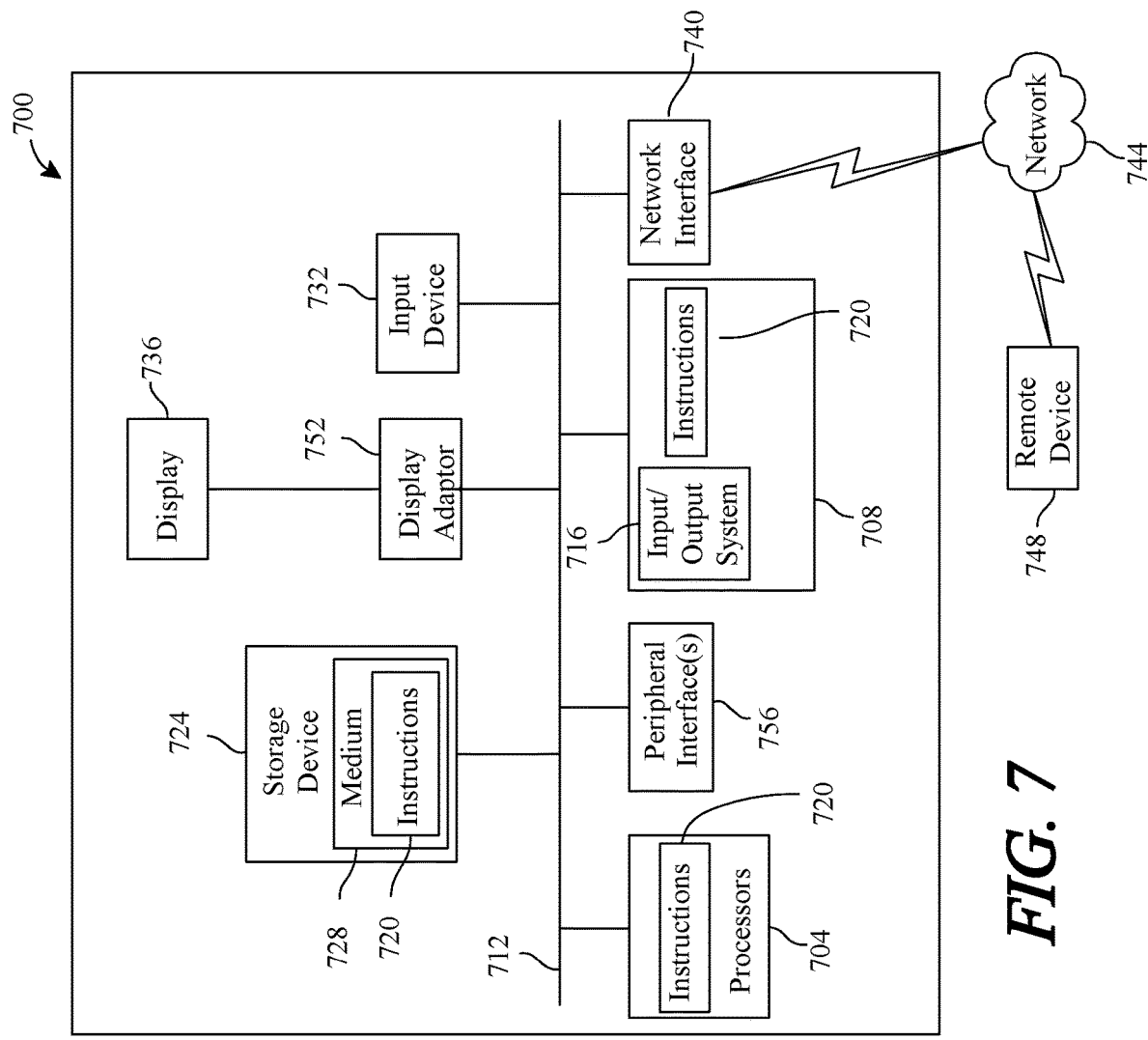
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for using machine learning to classify to temporal sections, the apparatus comprising:
    at least a processor; and
    a network interface device communicatively connecting the apparatus to a network;
    a memory communicatively connected to the processor, the memory containing instructions configuring the at least a processor to:
        identify a plurality of temporal ranges, associated with a plurality of first identifiers and a plurality of sets of descriptive data, wherein:
            each temporal range of the plurality of temporal ranges is associated with a first identifier of the plurality of first identifiers; and
            each first identifier of the plurality of first identifiers is associated with a set of descriptive data of the plurality of sets of descriptive data;
        generate a plurality of temporal sections, wherein each temporal range is divided into at least a temporal section of the plurality of temporal sections, wherein generating the plurality of temporal sections comprises:
            training, using first training data and a first machine learning algorithm, a first machine learning model, wherein the first training data includes a set of time limitation rules and a plurality of first identifier descriptive data; and
            generating, using the trained first machine-learning model as a function of an expected algorithmic loss relating temporal range inputs to temporal section outputs, the plurality of temporal sections, wherein the plurality of temporal ranges is provided to the trained first machine learning model as an input to output the plurality of temporal sections associated with the plurality of first identifiers, wherein the plurality of first identifiers are categorized utilizing a first identifier classifier based on the plurality of first identifier descriptive data, wherein the first identifier classifier is a neural network;
        receive a second identifier, wherein each second identifier of the plurality of second identifiers is associated with at least a temporal constraint received in the form of a bid, and a set of user data comprising at least a resume;
        classify a particular second identifier of the plurality of second identifiers to at least a particular temporal section of the plurality of temporal sections generated by the first machine learning model, wherein classifying the second identifier comprises:
            training, using second training data and a second machine learning algorithm, a second machine-learning model, wherein the second training data comprises a plurality of event factors data and the plurality of first identifier data correlated with temporal constraint data; and
            generating, using the trained second machine learning model, the at least a particular temporal section, wherein the particular second identifier is provided to the trained second machine learning model as an input to output the at least a particular temporal section; and
        output the at least a particular temporal section associated with the particular second identifier upon establishing a communicative connection between the apparatus and a remote device using the network interface, wherein the at least a particular temporal section provides a schedule showing one or more generated appointments between the particular second identifier and one or more first identifiers at an event.

2. The apparatus of claim 1, wherein generating a plurality of temporal sections for a plurality of first identifiers is numerical limited.

3. The apparatus of claim 1, wherein the generated plurality of temporal sections of the first identifier is displayed based on a second identifier selection.

4. The apparatus of claim 3, wherein the second identifier selection comprises a first identifier classifier based on descriptive data.

5. The apparatus of claim 1, wherein acquiring a plurality of temporal constraints from a plurality of second identifier comprises user data from the plurality of second identifiers.

6. The apparatus of claim 5, wherein the user data from the plurality of second identifiers is classified against the descriptive data of the plurality of first identifiers.

7. The apparatus of claim 5, wherein memory contains instructions further configuring processor to limit the number of temporal constraints received from a particular second identifier.

8. The apparatus of claim 1, wherein acquiring a plurality of time constraints from a plurality of second identifiers is limited to a predetermined time.

9. The apparatus of claim 1, wherein outputting temporal sections between a plurality of first identifiers and a plurality of second identifiers comprises a notification.

10. A method for using machine learning to classify temporal sections, the method comprising:
  identifying, using a computing device having a network interface, a plurality of temporal ranges, associated with a plurality of first identifiers and a plurality of sets of descriptive data, wherein:
    each temporal range of the plurality of temporal ranges is associated with a first identifier of the plurality of first identifiers; and
    each first identifier of the plurality of first identifiers is associated with a set of descriptive data of the plurality of sets of descriptive data;
  generating, using the computing device, a plurality of temporal sections, wherein each temporal range is divided into at least a temporal section of the plurality of temporal sections, wherein generating the plurality of temporal sections comprises:
    training, using first training data and a first machine learning algorithm, a first machine learning model, wherein the first training data includes a set of time limitation rules and a plurality of first identifier descriptive data; and
    generating, using the trained first machine-learning model as a function of an expected algorithmic loss relating temporal range inputs to temporal section outputs, the plurality of temporal sections, wherein the plurality of temporal ranges is provided to the trained first machine learning model as an input to output the plurality of temporal sections associated with the plurality of first identifiers, wherein the plurality of first identifiers are categorized utilizing a first identifier classifier based on the plurality of first identifier descriptive data, wherein the first identifier classifier is a neural network;
  receiving, using the computing device, a second identifier, wherein each second identifier of the plurality of second identifiers is associated with at least a temporal constraint received in the form of a bid, and a set of user data comprising at least a resume;
  classifying, using the computing device, a particular second identifier of the plurality of second identifiers to at least a particular temporal section of the plurality of temporal sections generated by the first machine learning model, wherein classifying the second identifier comprises:
    training, using second training data and a second machine learning algorithm, a second machine-learning model, wherein the second training data comprises a plurality of event factors data and a plurality of first identifier data correlated with temporal constraint data; and
    generating, using the trained second machine learning model, the at least a particular temporal section, wherein the particular second identifier is provided to the trained second machine learning model as an input to output the at least a particular temporal section; and
  outputting, using the computing device, the at least a particular temporal section associated with the particular second identifier upon establishing a communicative connection between the computing device and a remote device associated with the particular second identifier using the network interface, wherein the at least a particular temporal section provides a schedule showing one or more generated appointments between the particular second identifier and one or more first identifiers at an event.

11. The method of claim 10, wherein generating a plurality of temporal sections for a plurality of first identifiers is numerically limited.

12. The method of claim 10, wherein the generated plurality of temporal sections of the first identifier is displayed based on a second identifier selection.

13. The method of claim 12, wherein the second identifier selection comprises a first identifier classifier based on descriptive data.

14. The method of claim 10, wherein acquiring a plurality of temporal constraints from a plurality of second identifier comprises user data from the plurality of second identifiers.

15. The method of claim 14, wherein the user data from the plurality of second identifiers is classified against the descriptive data of the plurality of first identifiers.

16. The method of claim 14, further comprising limiting, by the computing device, the number of temporal constraints received from a particular second identifier.

17. The method of claim 10, wherein acquiring a plurality of time constraints from a plurality of second identifiers is limited to a predetermined time.

18. The method of claim 10, wherein outputting temporal sections between a plurality of first identifiers and a plurality of second identifiers comprises a notification.

* * * * *